US009803586B1

(12) United States Patent
Jackowski et al.

(10) Patent No.: US 9,803,586 B1
(45) Date of Patent: Oct. 31, 2017

(54) SECONDARY SYSTEMS AND METHODS OF CONTROL FOR VARIABLE AREA FAN NOZZLES

(71) Applicant: The Boeing Company, Chicago, IL (US)

(72) Inventors: Jason J. Jackowski, Everett, WA (US); Kent E. Karnofski, Lake Forest Park, WA (US); David W. Foutch, Seattle, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/169,155

(22) Filed: May 31, 2016

(51) Int. Cl.
F02K 1/00 (2006.01)
F02K 1/18 (2006.01)
F02K 1/12 (2006.01)
F01D 25/24 (2006.01)
F01D 21/00 (2006.01)
B64D 45/00 (2006.01)

(52) U.S. Cl.
CPC ............... *F02K 1/18* (2013.01); *B64D 45/00* (2013.01); *F01D 21/003* (2013.01); *F01D 25/24* (2013.01); *F02K 1/12* (2013.01); *F05D 2220/32* (2013.01); *F05D 2240/128* (2013.01); *F05D 2270/62* (2013.01)

(58) Field of Classification Search
CPC combination set(s) only.
See application file for complete search history.

(56) References Cited

U.S. PATENT DOCUMENTS

| 8,733,080 | B2* | 5/2014 | Jones | F02K 1/09 239/265.31 |
| 9,021,813 | B2 | 5/2015 | Jasklowski et al. | |
| 2010/0003121 | A1* | 1/2010 | Berryann | F02K 1/12 415/1 |
| 2013/0020408 | A1 | 1/2013 | Jasklowski et al. | |
| 2013/0075494 | A1* | 3/2013 | Vaughan | F02K 1/72 239/265.29 |
| 2013/0078081 | A1* | 3/2013 | Chakkera | F02K 1/64 415/150 |
| 2013/0145768 | A1* | 6/2013 | Vaughan | F02K 1/68 60/771 |
| 2013/0306755 | A1 | 11/2013 | Dittmann et al. | |
| 2015/0107220 | A1* | 4/2015 | Chakkera | F02K 1/72 60/226.2 |

(Continued)

*Primary Examiner* — Yonel Beaulieu
(74) *Attorney, Agent, or Firm* — Miller, Matthias & Hull LLP

(57) ABSTRACT

A control system for a variable area fan nozzle (VAFN) is disclosed. The VAFN may have a plurality of petals and may be for use with a gas turbine engine. The control system may include a primary system configured to acquire primary data indicative of an operating condition of the VAFN, a secondary system configured to acquire secondary data indicative of a current operating condition of the gas turbine engine, and a control module in operative communication with the primary system and the secondary system. The control module may be configured to: determine a nozzle area of the VAFN based at least in part on the primary data, adjust the determined nozzle area based on the secondary data, and position the plurality of petals according to the adjusted nozzle area.

20 Claims, 11 Drawing Sheets

(56) References Cited

U.S. PATENT DOCUMENTS

2015/0308374 A1* 10/2015 Gormley .................. F02K 1/09
  60/226.3
2016/0265476 A1* 9/2016 Bahadoran ............ F01D 11/005
2016/0333822 A1* 11/2016 Roberts .................... F02K 3/04

* cited by examiner

SECONDARY SYSTEMS AND METHODS OF CONTROL FOR VARIABLE AREA FAN NOZZLES

FIELD OF THE DISCLOSURE

The present disclosure relates generally to variable area fan nozzles and, more particularly, to controlling nozzle areas of variable area fan nozzles.

BACKGROUND OF THE DISCLOSURE

Bypass turbofan engines produce two exhaust flows, a core engine flow and a fan flow. The core engine flow is discharged from a core flow nozzle after passing through a core engine. The fan flow passes through an annular passageway formed by a nacelle surrounding the core engine and fan duct. The cross-sectional areas through which these two flows pass may be optimized for specific operating conditions, such as take-off, climb, cruise, etc. Variable area fan nozzles that include movable petals are used to enlarge or reduce the nozzle area of the fan flow, and thereby, decrease or increase the exhaust velocity, respectively.

SUMMARY OF THE DISCLOSURE

In accordance with one aspect, a control system for a variable area fan nozzle (VAFN) is disclosed. The VAFN may have a plurality of petals and may be for use with a gas turbine engine. The control system may include a primary system configured to acquire primary data indicative of an operating condition of the VAFN, a secondary system configured to acquire secondary data indicative of a current operating condition of the gas turbine engine, and a control module in operative communication with the primary system and the secondary system. The control module may be configured to: determine a nozzle area of the VAFN based at least in part on the primary data, adjust the determined nozzle area based on the secondary data, and position the plurality of petals according to the adjusted nozzle area.

In a refinement, the secondary data may include data indicative of a backpressure of the gas turbine engine.

In another refinement, the secondary system may include at least one pressure sensor configured to determine the backpressure of the gas turbine engine.

In another refinement, the at least one pressure sensor may be disposed proximate an aft end of a core engine nacelle of the gas turbine engine.

In another refinement, the secondary data may include data indicative of a fan blade strain of the gas turbine engine.

In another refinement, the secondary system may include at least one strain sensor configured to determine the fan blade strain of the gas turbine engine.

In another refinement, the at least one strain sensor may include a fiber optic strain sensor disposed on a fan blade of the gas turbine engine.

In another refinement, the control module may be further configured to determine an operational transient of the gas turbine engine based on the secondary data.

In another refinement, the control module may be further configured to send a signal to alert aircraft crew members of the operational transient.

In another refinement, the control module may be further configured to move the plurality of petals to a failsafe position when the secondary data indicates the operational transient.

In accordance with another aspect, an aircraft is disclosed. The aircraft may include a gas turbine engine, a variable area fan nozzle (VAFN) mounted to a downstream end of the gas turbine engine, the VAFN including a plurality of petals and at least one actuator configured to move the plurality of petals, and a control system in operative communication with the gas turbine engine and the VAFN. The control system may include at least one pressure sensor configured to determine a backpressure of the gas turbine engine, at least one strain sensor configured to determine a fan blade strain of the gas turbine engine, and a control module in operative communication with the at least one pressure sensor, the at least one strain sensor, and a primary system configured to configured to acquire primary data indicative of an operating condition of the VAFN.

In this aspect, the control module may be configured to: calculate a real-time nozzle area of the VAFN based at least in part on the primary data, generate an actuator command based at least in part on the real-time nozzle area and a predetermined table of nozzle areas preprogrammed into a memory of the control module, modify the actuator command based on at least one of the determined backpressure and the determined fan blade strain, and send the modified actuator command to the at least one actuator of the VAFN to adjust the plurality of petals.

In a refinement, the at least one pressure sensor may include one of a LIDAR based pressure sensor or a pitot tube.

In another refinement, the control module may be implemented via an engine electronic control and a VAFN control unit.

In another refinement, the control module may include a model based controller configured to estimate a nozzle area of the VAFN when primary data is unavailable.

In another refinement, the model based controller may include a learning algorithm for estimating the nozzle area based on inputs into the engine electronic control.

In another refinement, the control module may be further configured to determine an operational transient of the gas turbine engine if the estimated nozzle area from the model based controller is outside a predetermined margin of a calculated nozzle area determined by the VAFN control unit.

In accordance with another aspect, a method for controlling a nozzle area of a variable area fan nozzle (VAFN) is disclosed. The VAFN may have a plurality of petals and may be for use with a gas turbine engine. The method may include acquiring primary data indicative of an operating condition of the VAFN; acquiring secondary data indicative of a backpressure and a fan blade strain of the gas turbine engine; calculating the nozzle area of the VAFN based on the primary data; generating a desired nozzle area based at least in part on a predetermined table of nozzle areas; producing an actuator command based on a difference between the calculated nozzle area and the desired nozzle area; adjusting the actuator command based on the secondary data; and sending the adjusted actuator command to the VAFN to move the plurality of petals, the calculating, generating, producing, adjusting, and sending being performed by a control module associated with the VAFN and the gas turbine engine.

In a refinement, the method may further include learning a nozzle area of the VAFN based on inputs into an engine electronic control of the gas turbine engine, the learning being performed by a model based controller of the control system.

In another refinement, the method may further include using the secondary data to determine an operational transient of the gas turbine engine.

In another refinement, the method may further include alerting aircraft crew members of the operational transient and moving the plurality of petals of the VAFN to a failsafe position when the operational transient is determined.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Figure 1:
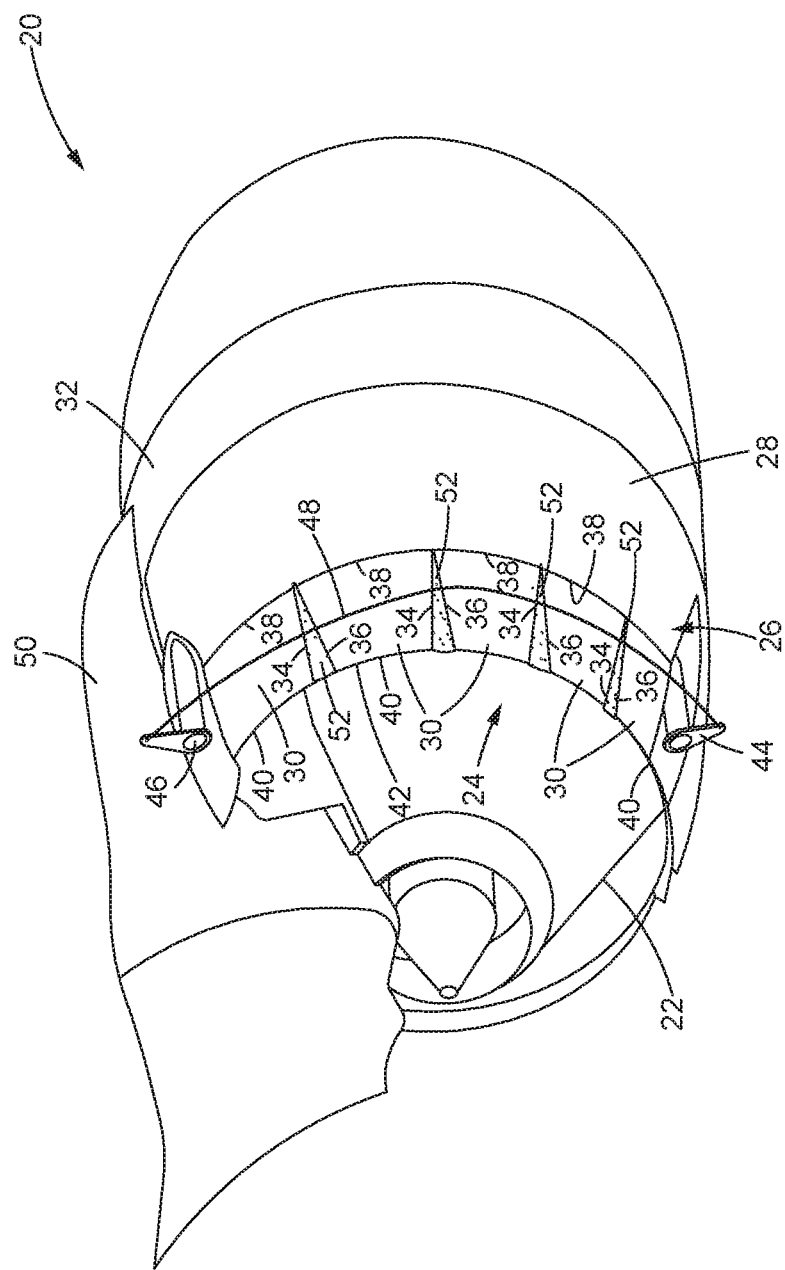
FIG. 1 is a perspective view of a gas turbine engine, in accordance with one embodiment of the present disclosure.

Referring now to the drawings, and with specific reference to FIG. 1, an engine 20 is shown, in accordance with certain embodiments of the present disclosure. Although the engine 20 is illustrated as a gas turbine engine, the engine may be of any other type. It is to be understood that the engine 20 is shown primarily for illustrative purposes to assist in disclosing features of various embodiments, and that FIG. 1 does not depict all of the components of an engine. Furthermore, the engine 20 is included in an aircraft and used for generating thrust. However, the engine 20 may also be included in land, marine, or aircraft applications for generating power as well.

The engine 20 includes a core flow nozzle 22 and variable area fan nozzle (VAFN) 24. The core flow nozzle 22 forms a downstream end of a core engine nacelle that surrounds the core engine (not shown). The VAFN 24 is mounted to a downstream end 26 or lip area of a thrust reverser sleeve 28. The sleeve 28 overlaps at least a portion of the core engine nacelle. The engine 20 provides thrust from both a core flow of engine exhaust exiting the core flow nozzle 22 and a fan flow exiting from the VAFN 24. The core flow typically has a higher velocity than the fan flow.

The VAFN 24 includes a plurality of petals 30 configured to alter the fan flow passing through a fan duct 32 of the engine 20. The petals 30 may be elastically deformable petals or pivotable rigid petals. In one example, each of the plurality of petals 30 is generally trapezoidal in shape, although the petals 30 may have any other shape. Each of the petals 30 include a first side 34 and an opposite second side 36 that extend in a generally longitudinal direction from a supported end 38 to a free end 40. The petals 30 may be disposed side by side along a circumference of the fan duct 32, with the supported ends 38 of the petals 30 mounted to the downstream end 26 of the thrust reverser sleeve 28. The free ends 40 of the petals 30 form a nozzle opening 42 or circumference, which is associated with a nozzle area of the VAFN 24.

The petals 30 are configured to alter the nozzle area in order to change the fan flow passing through the fan duct 32. For instance, the petals 30 may be moved inward or outward using actuators 44, 46 connected to a flex rod 48. The flex rod 48 may press on the petals 30 disposed between actuators 44, 46. The actuators 44, 46 may be hydraulically actuated via electrohydraulic servo valves configured to control supply of hydraulic fluid to the actuators 44, 46. However, other configurations for actuation of the plurality of petals 30 may be used.

In the example shown in FIG. 1, the VAFN 24 includes two sets of petals 30 arranged on opposite sides of an engine pylon 50, although only one set of petals 30 is visible in this view. Disposed generally circumferentially, the flex rod 48 comprises a cable that extends between the actuators 44, 46. The flex rod 48 contacts all the petals in the respective set, and ends of the flex rod 48 are attached to the actuators 44, 46, such as via arms mounted to shafts.

In addition, adjacent petals 30 in each set may be separated by a gap occupied by an elastomeric seal 52. Composed of silicone rubber or any other suitable material, seals 52 are used to prevent leakage of air from inside to outside the VAFN 24. Seals 52 return from a stretched condition to a nominal condition during inward actuation of the petals 30. Other configurations for the VAFN 24 can be used. Furthermore, aspects of this disclosure may apply to other types of VAFN 24.

Figure 2:
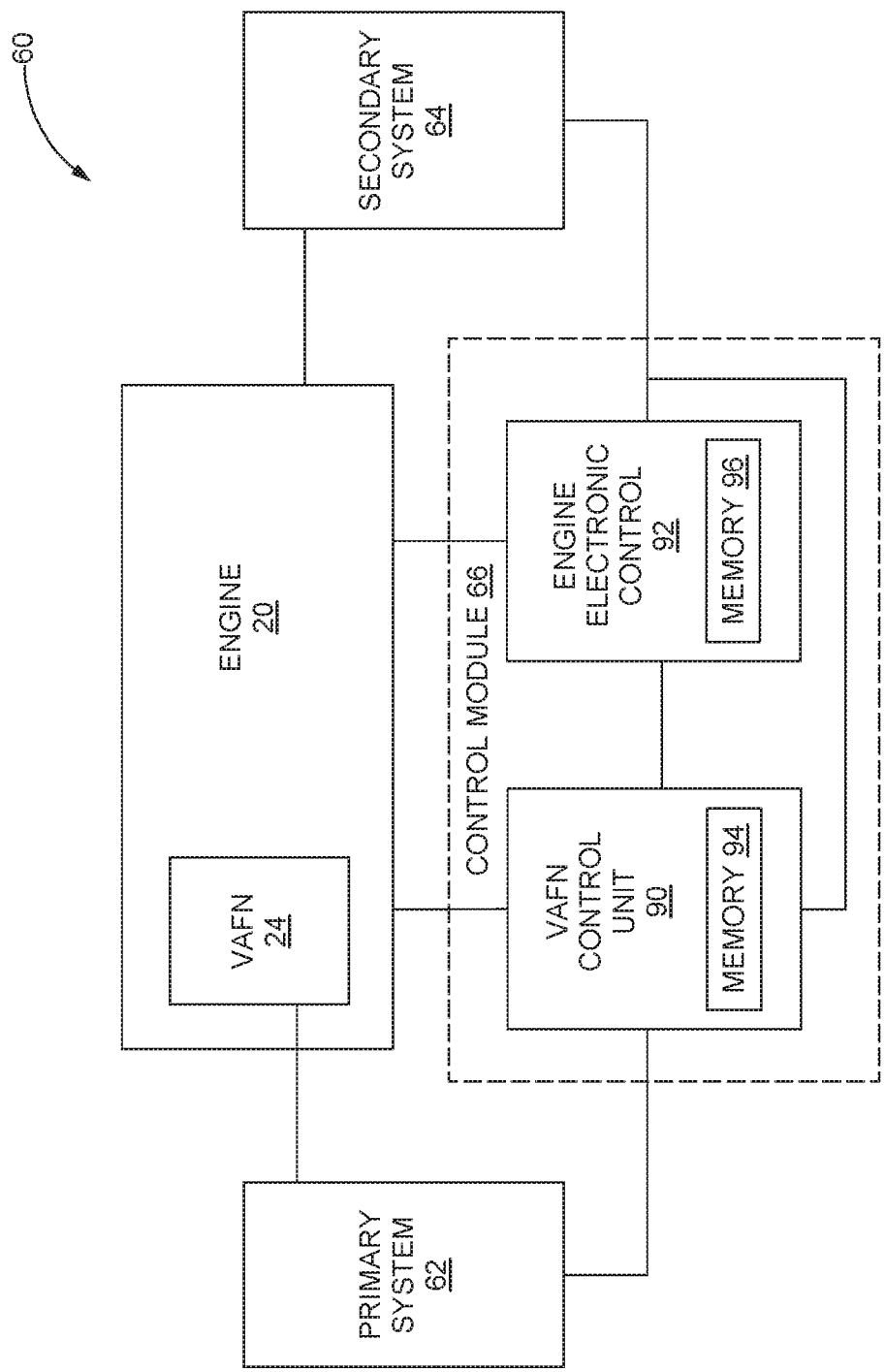
FIG. 2 is a schematic representation of a control system for a variable area fan nozzle (VAFN) of the gas turbine engine of FIG. 1.

Referring now to FIG. 2, with continued reference to FIG. 1, the engine 20 further includes a control system 60 for the VAFN 24. The control system 60 comprises a primary system 62, a secondary system 64, and a control module 66 in operative communication with the primary system 62 and the secondary system 64. Each of the primary system 62 and the secondary system 64 comprises a sensing system.

More specifically, the primary system 62 is configured to acquire primary data indicative of a current operating condition of the VAFN 24 in real-time, while the secondary system 64 is configured to acquire secondary data indicative of a current operating condition of the engine 20 in real-time. The primary data from the primary system 62 is used to determine a current nozzle area of the VAFN 24. The secondary data from the secondary system 64 is used to optimize or adjust the nozzle area of the VAFN 24. In so doing, an optimal position of the petals 30 may be found based on current performance of the engine 20 and the VAFN 24.

For example, the primary system 62 includes one or more fiber optic shape sensors, photogrammetry components, circumferential sensors, linear variable differential transformers (LVDT), and the like. Such sensing technologies provide primary data for the VAFN 24, such as strain measurements on the petals 30, three dimensional coordinates of the petals 30, positions of the actuators 44, 46, and the like. However, other types of sensing technologies, such as hall effect sensors and/or LIDAR sensors, may be used as well in order to acquire primary data indicative of current operating conditions of the VAFN 24 in real-time.

Figure 3:
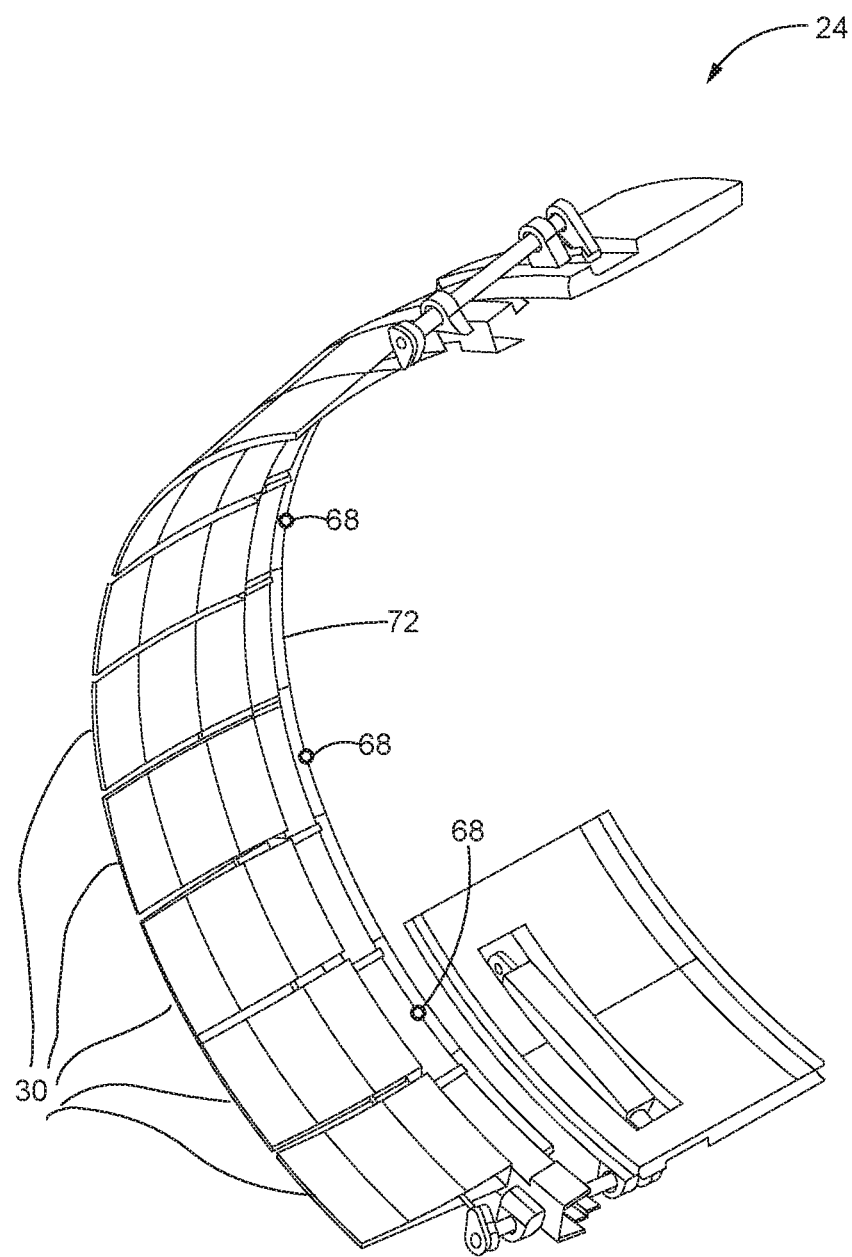
FIG. 3 is a perspective view of part of a VAFN of the gas turbine engine of FIG. 1 from aft looking forward.
Figure 4:
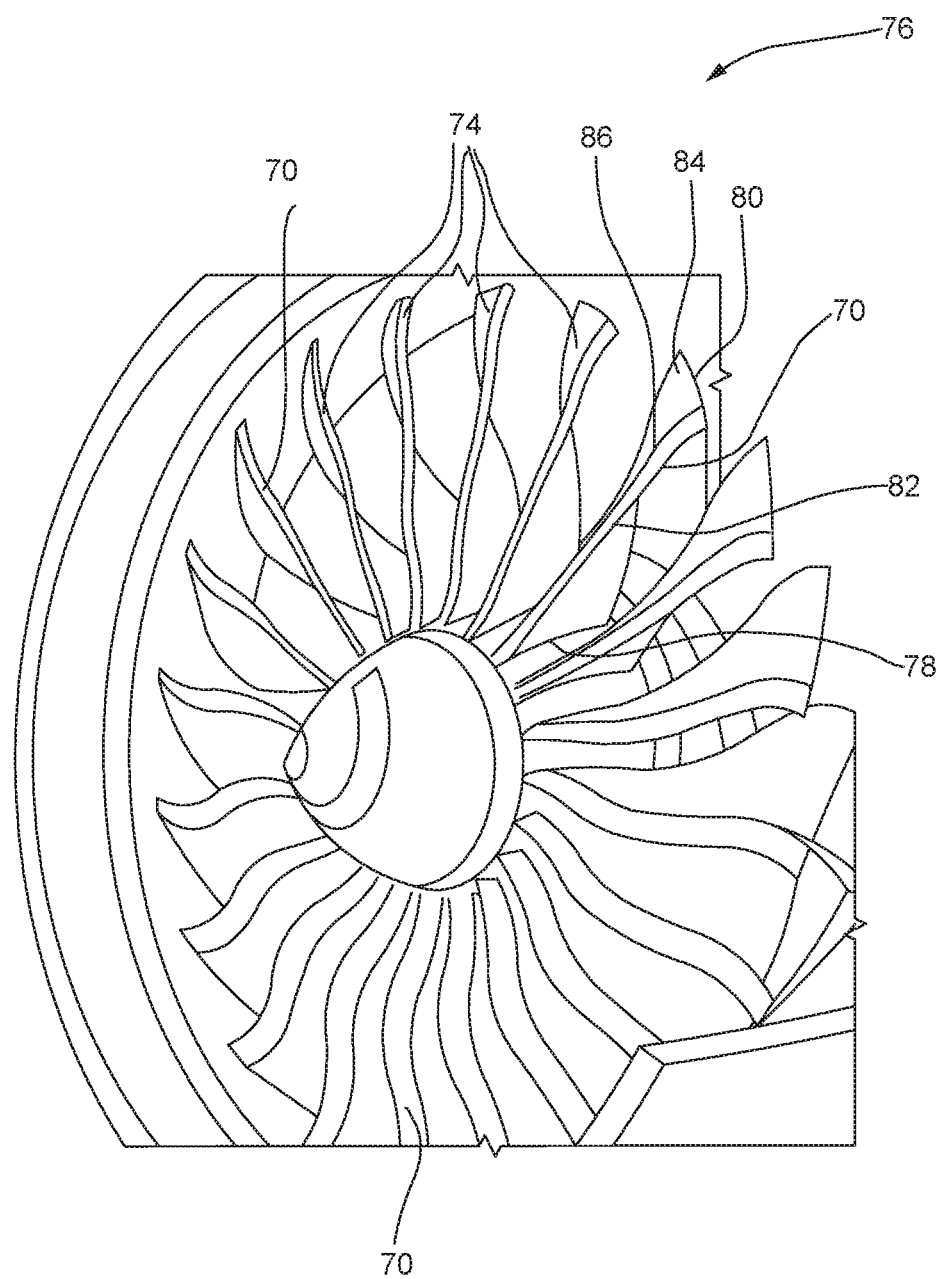
FIG. 4 is a perspective view of a fan section of the gas turbine engine of FIG. 1.

The secondary system 64 includes one or more pressure sensors 68, shown in FIG. 3, and/or one or more fan blade strain sensors 70, shown in FIG. 4. Such sensing technologies provide secondary data for the engine 20, such as data indicative of a backpressure of the engine 20 and data indicative of a fan blade strain of the engine 20. However, other sensing technologies may be used, in addition to or instead of the pressure sensors 68 and the fan blade strain sensors 70, to acquire secondary data indicative of current operating conditions of the engine 20. The secondary data from the secondary system 64 is used to both detect operational transients of the engine 20 and optimize the nozzle area of the VAFN 24.

More specifically, the pressure sensors 68 are configured to determine the backpressure of the engine 20, or a pressure at an aft end of the core engine nacelle, in real-time. For example, the pressure sensors 68 may comprise LIDAR based pressure sensors, pitot tubes, and the like. The pressure sensors 68 are disposed proximate the aft end of the core engine nacelle.

In the example shown in FIG. 3, the pressure sensors 68 are disposed on an attachment bulkhead 72 of the VAFN 24 that mounts to the core engine nacelle. Furthermore, in the example of FIG. 3, every other petal 30 of the VAFN 24 is associated with a pressure sensor 68. However, other configurations for placement and positioning of the pressure sensors 68 may be used.

The fan blade strain sensors 70 are configured to determine the fan blade strain of the engine 20, or a strain on a plurality of blades 74 (FIG. 4) in a fan 76 (FIG. 4) of the engine 20, in real-time. The fan blade strain sensors 70 may comprise fiber optic strain sensors, or other types of strain sensors, disposed on one or more fan blades 74 of the engine 20. For example, the fan blade strain sensors 70 may be mounted to each of the fan blades 74, alternate fan blades, or any other configuration.

In the example of FIG. 4, the fan blade strain sensors 70 are embedded inside the fan blades 74. For instance, within the fan blade 74, there may be a channel for receiving the fan blade strain sensor 70. However, other configurations for mounting the fan blade strain sensors 70 to the fan blades 74 may be used.

Furthermore, in the example of FIG. 4, each of the fan blade strain sensors 70 extends along a span of the fan blade 74 from a base 78 of the blade 74 to a tip 80 of the blade 74. The fan blade strain sensors 70 may be positioned proximate a leading edge 82, a trailing edge 84, or a midpoint 86 of the fan blade 74. However, other positions for the fan blade strain sensors 70 may be used.

Referring back to FIG. 2, the control module 66 is in operative communication with the engine 20, the VAFN 24, the primary system 62, and the secondary system 64. The control module 66 may be implemented using one or more of a processor, a microprocessor, a microcontrol, a digital signal processor (DSP), a field-programmable gate array (FPGA), an electronic control module (ECM), an electronic control unit (ECU), and a processor-based device that may include or be associated with a non-transitory computer readable storage medium having stored thereon computer-executable instructions, or any other suitable means for electronically controlling functionality of the engine 20, the VAFN 24, and the plurality of petals 30.

In the example of FIG. 2, the control module 66 comprises a VAFN control unit 90 and an engine electronic control 92. However, other configurations for the control module 66 may be used. Each of the VAFN control unit 90 and the engine electronic control 92 is configured to operate according to predetermined algorithms or sets of instructions for operating the control system 60.

Such algorithms or sets of instructions may be programmed or incorporated into a memory 94 and a memory 96 associated with or at least accessible to the VAFN control unit 90 and the engine electronic control 92, respectively. Each of the memories 94, 96 may comprise a non-volatile memory provided within and/or external to the VAFN control unit 90 and the engine electronic control 92, respectively. It is understood that the VAFN control unit 90, the engine electronic control 92, and the control system 60 may include other hardware, software, firmware, and combinations thereof.

Furthermore, the engine electronic control 92 is configured to generate a desired nozzle area and send a corresponding signal to the VAFN control unit 90. In one example, the engine electronic control 92 may generate the desired nozzle area based on an engine operating condition. For instance, the engine electronic control 92 may include a predetermined table of optimum or desired nozzle areas for different engine operating conditions in order to achieve a desired result. The predetermined table of desired nozzle areas may be preprogrammed into the memory 96 associated with the engine electronic control 92.

Examples of engine operating conditions may include take-off, climb, cruise, flight conditions, thrust conditions, and the like. Examples of desired results may include a lower fuel burn, a fuel flow, a thrust, and the like. Based on the real-time engine operating condition, the engine electronic control 92 retrieves from memory 96 the desired nozzle area from the predetermined table.

The engine electronic control 92 then sends a command to the VAFN control unit 90 to achieve an appropriate opening area of the VAFN 24 for the current engine operating condition. The engine electronic control 92 can also determine that no optimum area can be achieved for a particular engine operating condition and may determine a non-optimum area for that particular condition. The VAFN control unit 90 controls the rate of movement of the petals 30 to different positions or maintains a position to achieve the desired nozzle area.

Based, at least in part, on the signal indicative of the desired nozzle area from the engine electronic control 92, the VAFN control unit 90 sends corresponding signals to the electrohydraulic servo valve in order to control hydraulic flow to the actuators 44, 46. For instance, the VAFN control unit 90 may send signals to the electrohydraulic servo valve to increase or decrease hydraulic flow to the actuators 44, 46 of the flex rod 48 and move the petals 30 outward or inward in order to change the shape of the nozzle opening 42 (FIG. 1) and achieve the desired nozzle area. The VAFN control unit 90 may also send signals to the electrohydraulic servo valve to maintain a same hydraulic flow to the actuators 44, 46 in order to maintain a same nozzle area.

Figure 5:
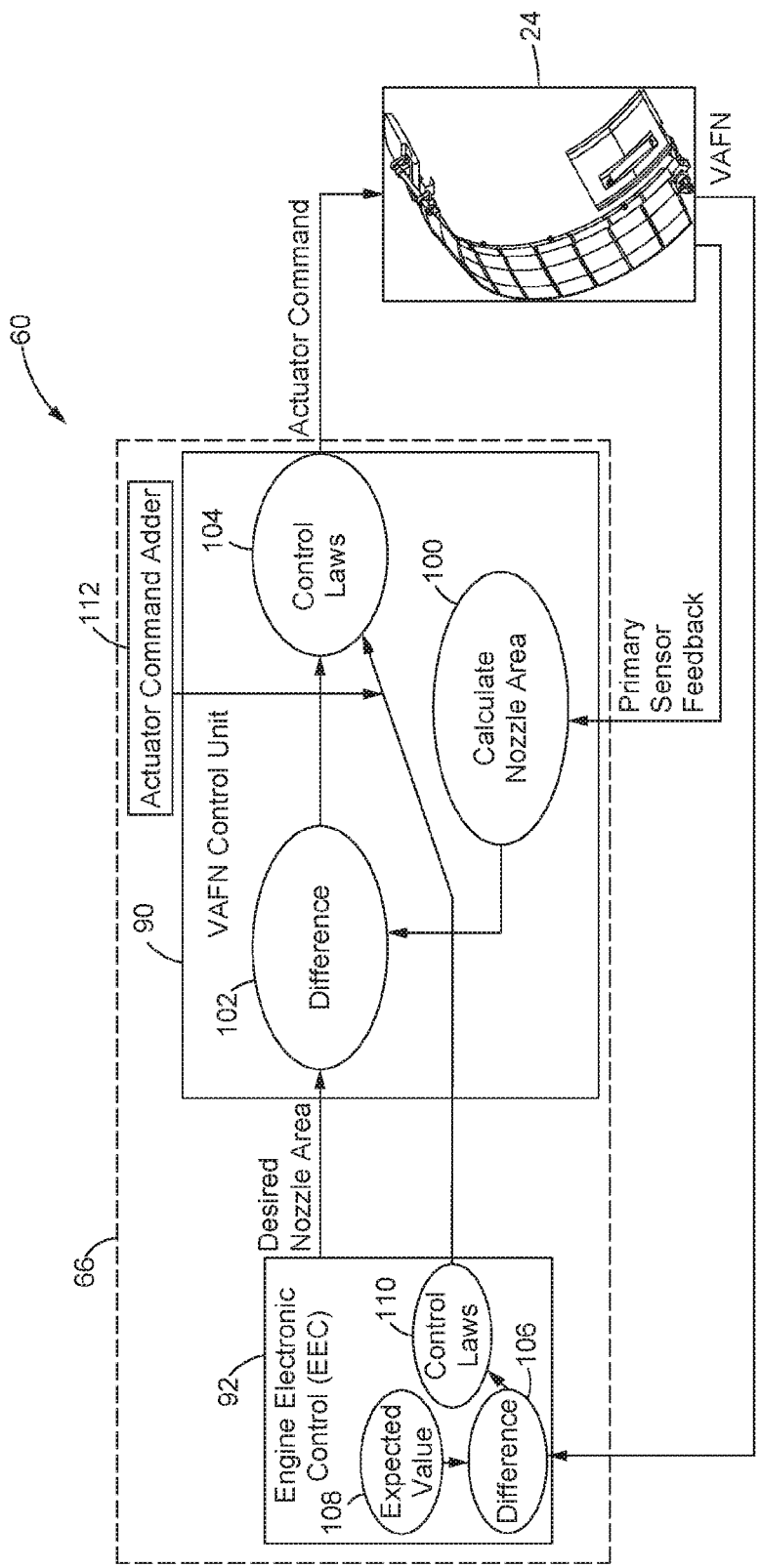
FIG. 5 is a schematic representation of a VAFN control system.

Referring now to FIG. 5, with continued reference to FIGS. 1-4, another schematic representation of the control system 60 is shown. In this aspect, the control module 66 is further configured to optimize the nozzle area of the VAFN 24 based on the primary data and the secondary data from the primary system 62 and the secondary system 64, respectively. More specifically, the VAFN control unit 90 is configured to receive from the primary system 62 the primary data, such as data indicative of the strain measurements on the petals 30, the three dimensional coordinates of the petals 30, and the positions of the actuators. Based on the primary data, the VAFN control unit 90 is configured to determine a real-time nozzle area of the VAFN 24, at module 100.

For example, along with the primary data from the primary system 62, the VAFN control unit 90 may use predetermined formulae and information, such as an installation geometry of the VAFN 24, preprogrammed into memory 94 in order to calculate the real-time nozzle area of the VAFN 24. The VAFN control unit 90 is also configured to receive the signal from the engine electronic control 92 indicative of the desired nozzle area. Furthermore, the VAFN control unit 90 is configured to determine a difference between the real-time nozzle area and the desired nozzle area, at module 102. Based, at least in part, on the determined difference between the calculated nozzle area and the desired nozzle area, the VAFN control unit 90 is further configured to use control laws to generate an actuator command to adjust the petals 30 of the VAFN 24, at module 104.

The actuator command is sent to the electrohydraulic servo valves that control hydraulic flow to the actuators 44, 46 of the flex rod 48 in contact with the petals 30. For example, the VAFN control unit 90 may be configured to use proportional integral differential (PID), linear quadratic regression (LQR), or bang-bang control. However, other types of feedback loop control and control laws may be used. More specifically, using control laws such as PID, LQR, or bang-bang control, the VAFN control unit 90 continuously applies the difference between the calculated nozzle area in real-time and the desired nozzle area as feedback in order to generate actuator commands and modify the real-time nozzle area.

In addition, the control module 66 is further configured to adjust the real-time nozzle area based on the secondary data from the secondary system 64. More specifically, the engine electronic control 92 is configured to receive the secondary data from the secondary system 64, such as data indicative of a real-time backpressure of the engine 20 and/or a real-time fan blade strain of the engine 20. Based on the secondary data, the engine electronic control 92 is configured to determine a difference between the secondary data and predetermined values for the same, at module 106.

The predetermined values for the backpressure and the fan blade strain are preprogrammed into the memory 96 associated with the engine electronic control 92. For example, at module 108, the predetermined values for the backpressure and the fan blade strain comprise expected values for the backpressure and the fan blade strain, respectively, based on a flight condition, an engine speed, a Mach number, an altitude, and the like. The predetermined values for the backpressure and the fan blade strain are determined from prior analysis, such as computer simulation, model-based analysis, ground test results, in-flight test results, and the like.

A difference between the real-time backpressure and the predetermined backpressure is determined by the engine electronic control 92, as well as a difference between the real-time fan blade strain and the predetermined fan blade strain. The engine electronic control 92 is further configured to use control laws to generate an actuator command to send to the VAFN control unit 90, at module 110. For example, the engine electronic control 92 may be configured to use proportional integral differential (PID), linear quadratic regression (LQR), or bang-bang control, although other types of feedback loop control and control laws may be used. The engine electronic control 92 uses the control laws to continuously apply the difference between the secondary data and the predetermined values in order to generate actuator commands and modify the real-time nozzle area.

Furthermore, the control module 66 includes an adder 112 configured to combine the actuator command from the engine electronic control 92 with the control laws, at module 104, in the VAFN control unit 90 in order to generate the actuator command to the VAFN 24 to adjust the petals 30. The adder 112 incorporates the secondary data with the primary data to optimize the nozzle area of the VAFN 24. In so doing, the control module 66 uses both sensor feedback from the engine 20 and sensor feedback from the VAFN 24 in order to accurately position the petals 30, thereby achieving enhanced performance for fuel burn, operability, and/or thrust at different flight conditions.

Figure 6:
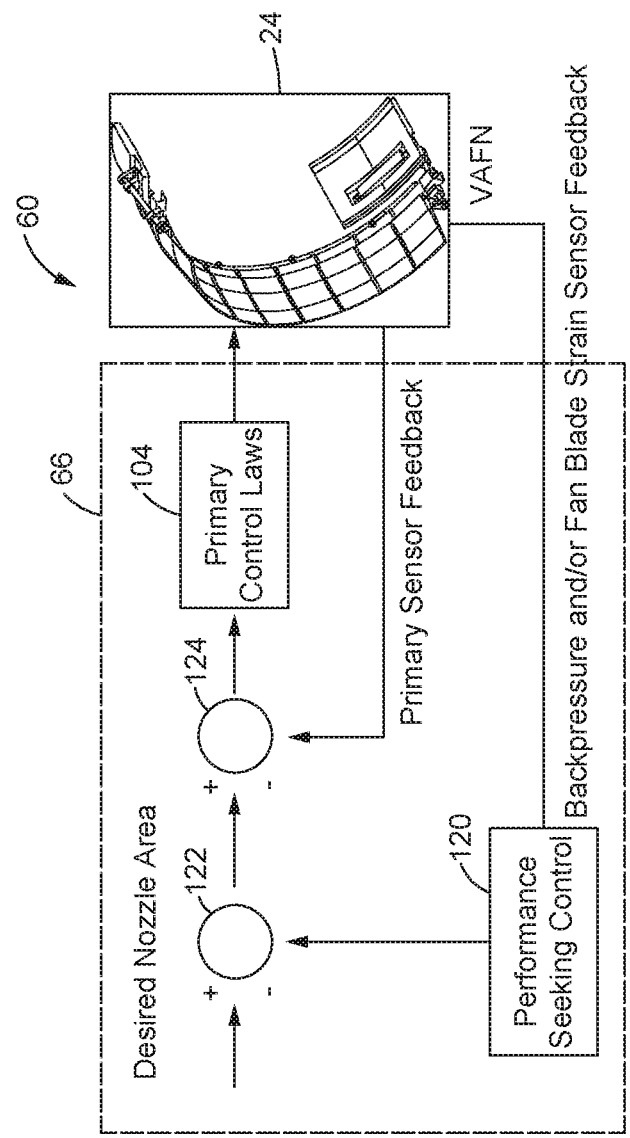
FIG. 6 is a control theory diagram of the VAFN control system.

Turning now to FIG. 6, with continued reference to FIGS. 1-5, a control theory diagram of the control system 60 is shown. In this aspect, the secondary data is used in a performance seeking control that performs a sweep of the nozzle area in slight increments and selects an optimum or desired position for the petals 30 of the VAFN 24 from the sweep for the flight condition, at module 120. More specifically, the control module 66 is configured to move the actuators 44, 46 of the VAFN 24 within a predetermined tolerance and select an actuator position that provides an optimum or desired backpressure result and/or an optimum or desired fan blade strain result. For example, the predetermined tolerance can be set to one percent (1%) of a nominal nozzle area based on a cruise flight condition. However, other values for the predetermined tolerance may be used.

The control module 66 sends signals to increase or decrease hydraulic flow to the actuators 44, 46 of the flex rod 48 and move the petals 30 outward or inward about a current position of the petals 30. With each slight increment the actuators 44, 46 are moved, the nozzle area of the VAFN 24 is changed, and the real-time backpressure and the real-time fan blade strain from the secondary system 64 are monitored. The optimum or desired position for the petals 30 is selected based on the actuator position that provides the optimum or desired backpressure result and/or the optimum or desired fan blade strain result. For example, to obtain the optimum or desired results, the control module 66 may be configured to determine a minimum or a maximum of a cost function based on the real-time backpressure and the real-time fan blade strain.

In addition, the control module 66 is configured to use the optimum or desired results from the sweep of the performance seeking control in order to adjust the desired nozzle area from the engine electronic control 92. For instance, the control module 66 may include a first adder 122 to bias the desired nozzle area based on the optimum or desired results from the sweep of the performance seeking control. Furthermore, the control module 66 may include a second adder 124 that combines the biased desired nozzle area from the first adder 122 with the primary data from the primary system 62 in order to obtain an adjusted nozzle area. At module 104, control laws, such as PID, LQR, or bang-bang control, are used by the control module 66 to generate and send actuator commands to the VAFN 24 in order to achieve the adjusted nozzle area.

Figure 7:
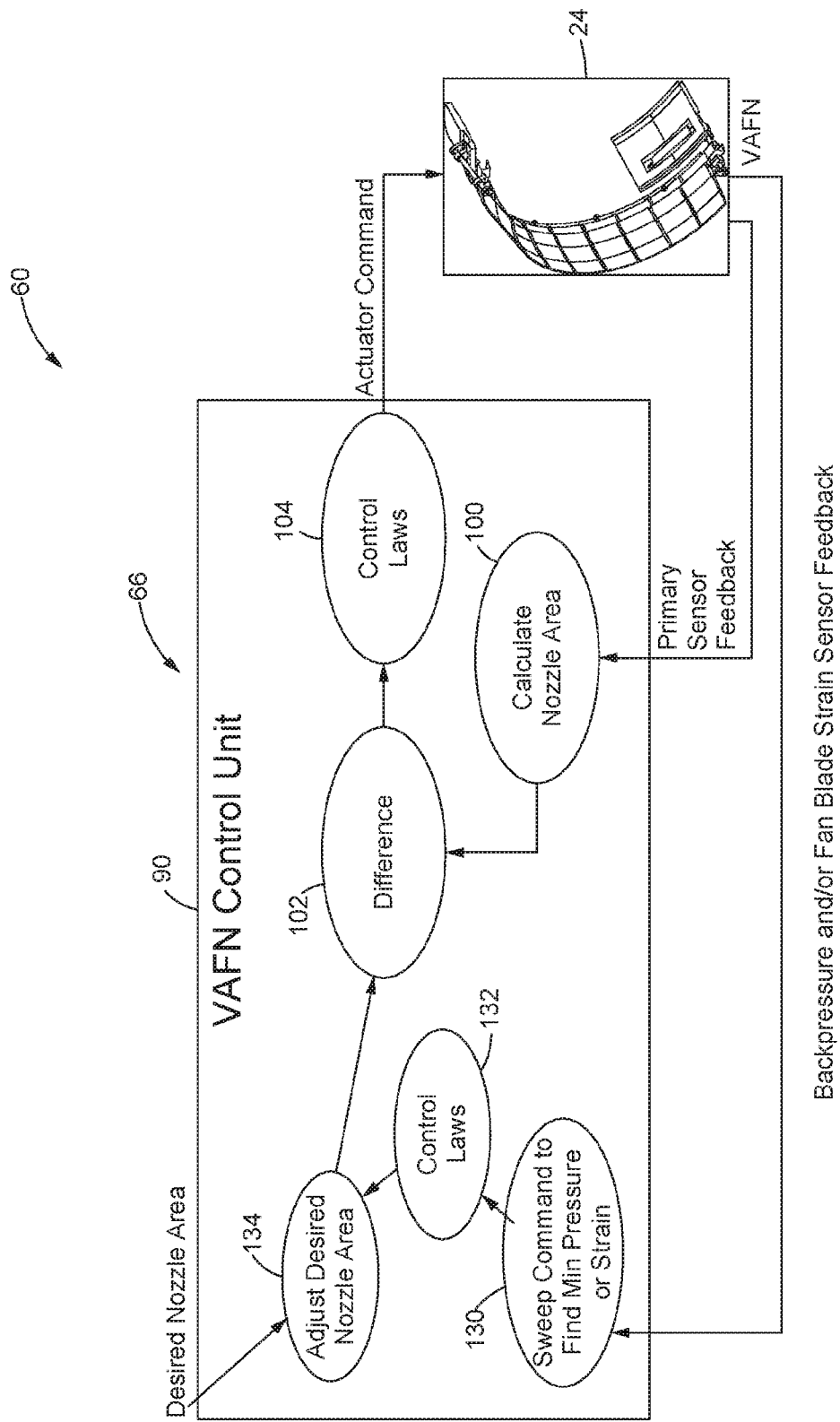
FIG. 7 is a schematic representation of the VAFN control system.

FIG. 7 shows an implementation of the control theory diagram of FIG. 6. In this aspect, the control module 66 implements performance seeking control via the VAFN control unit 90. More specifically, at module 130, the VAFN control unit 90 is configured to perform the sweep to obtain the actuator position that provides the optimum or desired backpressure result and/or the optimum or desired fan blade strain result. The VAFN control unit 90 is further configured to use control laws, such as PID, LQR, or bang-bang control, on the actuator position obtained by the sweep to generate a nozzle area bias, at module 132. Furthermore, module 132 selects the nozzle area bias that provides the optimum or desired result from a cost function based on, for example, a maximum thrust, a minimum fuel flow, a minimum backpressure, a minimum fan blade strain, a weighted combination thereof, and the like.

At module 134, the nozzle area bias is used to adjust the desired nozzle area from the engine electronic control 92 to produce an adjusted desired nozzle area for the VAFN 24. At module 102, a difference between the adjusted desired nozzle area and the calculated nozzle area based on the primary data, from module 100, is determined by the VAFN control unit 90. At module 104, control laws, such as PID, LQR, or bang-bang control, are applied to the difference between the adjusted desired nozzle area and the calculated nozzle area in order to generate and send actuator commands to the VAFN 24 to position the petals 30. For instance, module 104 drives the difference between the adjusted desired nozzle area and the calculated nozzle area to zero by changing the actuator commands sent to the VAFN 24. However, other configurations for the control module 66 may be used.

Figure 8:
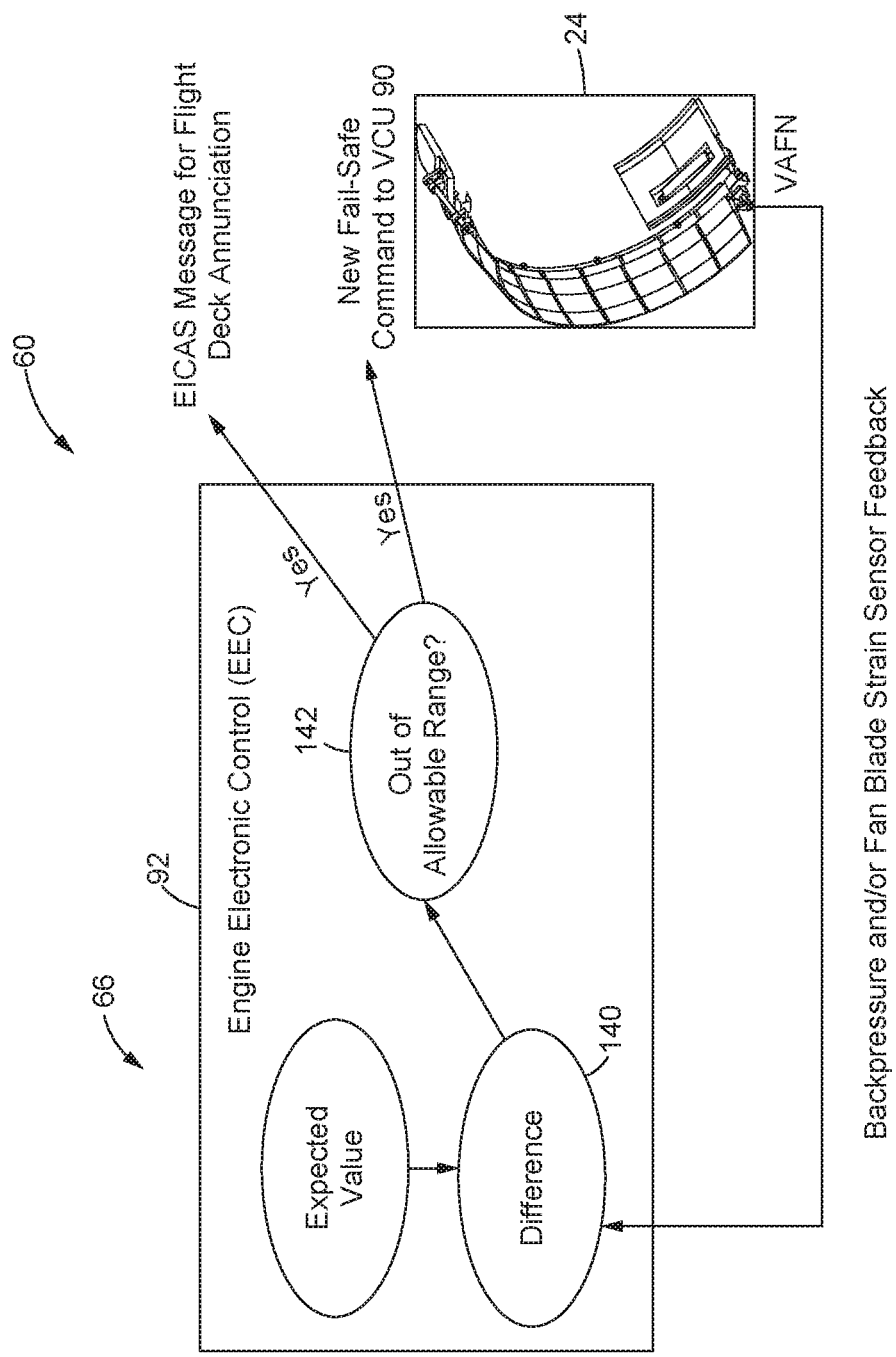
FIG. 8 is a schematic representation of the VAFN control system.

Referring now to FIG. 8, with continued reference to FIGS. 1-7, another schematic representation of the control system 60 is shown. In the example of FIG. 8, the engine electronic control 92 is configured to determine operational transients of the engine 20. More specifically, engine electronic control 92 receives the secondary data, such as current values for the backpressure and/or the fan blade strain, and compares the secondary data to predetermined values for the same.

At module 140, a difference between the real-time value and the predetermined value for each of the backpressure and the fan blade strain is calculated by the engine electronic control 92. The engine electronic control 92 determines if the difference between the current value and the expected value is within a predetermined range preprogrammed into the memory 96 associated with the engine electronic control 92, at module 142. The predetermined range for the difference includes an upper limit and a lower limit of acceptable values for the difference between the current value and the expected value for each of the backpressure and the fan blade strain. The upper and lower limits are selected based on a type of the engine 20 and/or the VAFN 24.

If the difference between the current value and the expected value for the backpressure and/or the fan blade strain is outside of the predetermined range, the engine electronic control 92 determines an operational transient of the engine 20 is occurring and sends a signal to alert aircraft crew members. For example, the engine electronic control 92 may send a signal to an Engine Indication and Crew Alert System (EICAS) to generate a message alerting aircraft crew members. In addition, the engine electronic control 92 may send a signal to the VAFN control unit 90 to move the plurality of petals 30 to a failsafe position when the secondary data indicates the operational transient.

Based on the signal from the engine electronic control 92, the VAFN control unit 90 may send corresponding signals to the electrohydraulic servo valve in order to control hydraulic flow to the actuators 44, 46. For instance, the VAFN control unit 90 may send signals to the electrohydraulic servo valve to increase or decrease hydraulic flow to the actuators 44, 46 of the flex rod 48 and move the petals 30 outward or inward in order to achieve the failsafe position. In one example, the failsafe position comprises moving the petals 30 maximally outward such that the nozzle opening 42 attains a maximum nozzle area.

In another example, the failsafe position comprises a floating condition wherein the petals 30 are floating, or moving with aerodynamic and thrust forces impinging on the petals 30. In yet another example, the failsafe position comprises moving the petals 30 maximally outward then to the floating condition if the maximum nozzle area cannot be achieved. However, other configurations for the failsafe position may be used.

Figure 9:
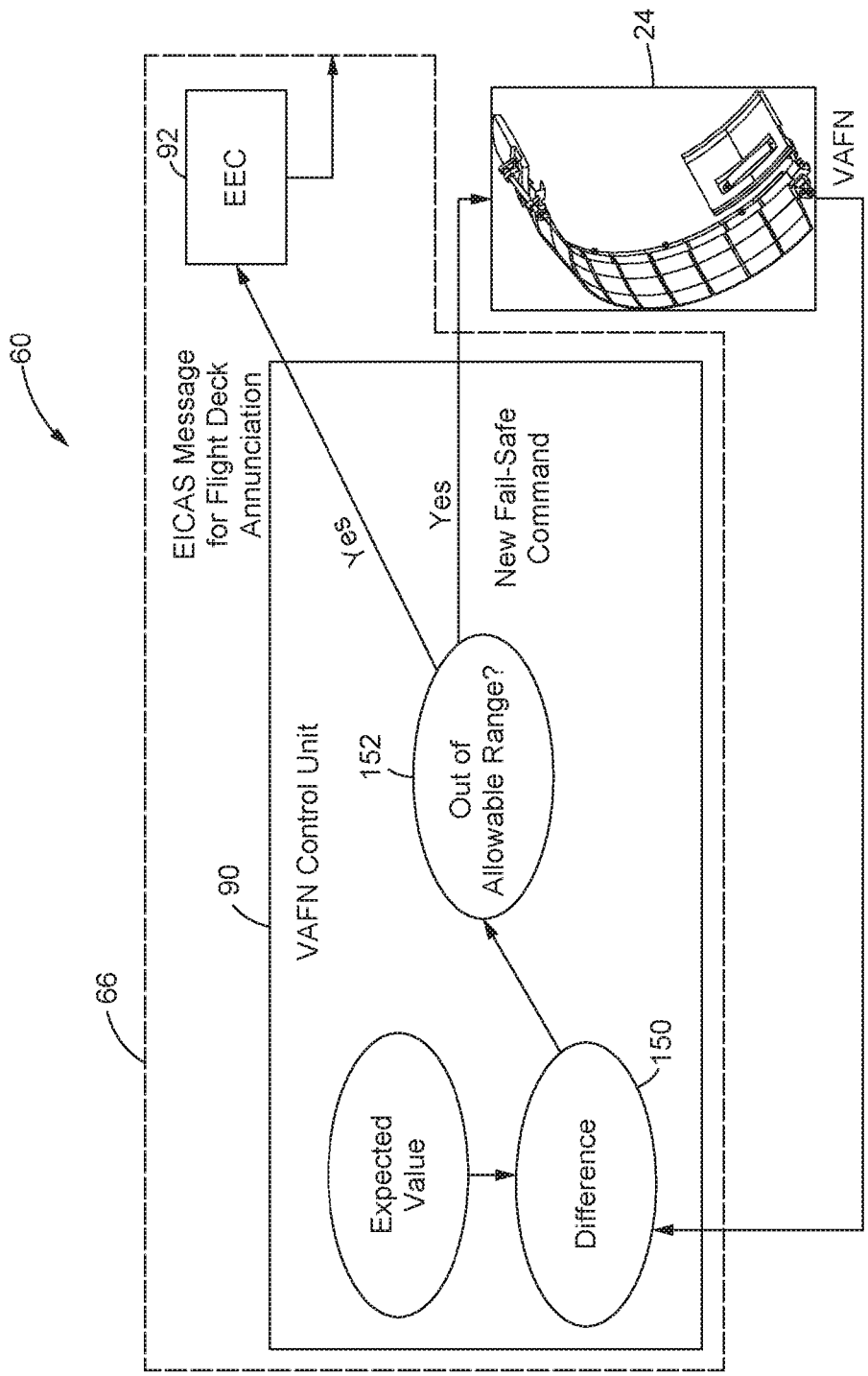
FIG. 9 is a schematic representation of the VAFN control system.

Referring now to FIG. 9, with continued reference to FIGS. 1-8, another schematic representation of the control system 60 is shown. In this example, the VAFN control unit 90 is configured to determine operational transients of the engine 20. The determination of operational transients of the engine 20 is similar to the example of FIG. 8, except with the determination being performed by the VAFN control unit 90 instead of the engine electronic control 92. More specifically, the VAFN control unit 90 receives the secondary data, such as current values for the backpressure and/or the fan blade strain, and compares the secondary data to the predetermined values for the same, which are preprogrammed into the memory 94 of the VAFN control unit.

At module 150, the VAFN control unit 90 calculates the difference between the secondary data and the predetermined values, and determines whether the difference is within the predetermined range preprogrammed into the memory 94 of the VAFN control unit 90, at module 152. If the difference between the current value and the expected value for the backpressure and/or the fan blade strain is outside of the predetermined range, the VAFN control unit 90 determines an operational transient of the engine 20. The VAFN control unit 90 then sends a signal to the engine electronic control 92 to alert aircraft crew members and/or sends signals to the VAFN 24 to move the plurality of petals 30 to the failsafe position when the secondary data indicates the operational transient.

Figure 10:
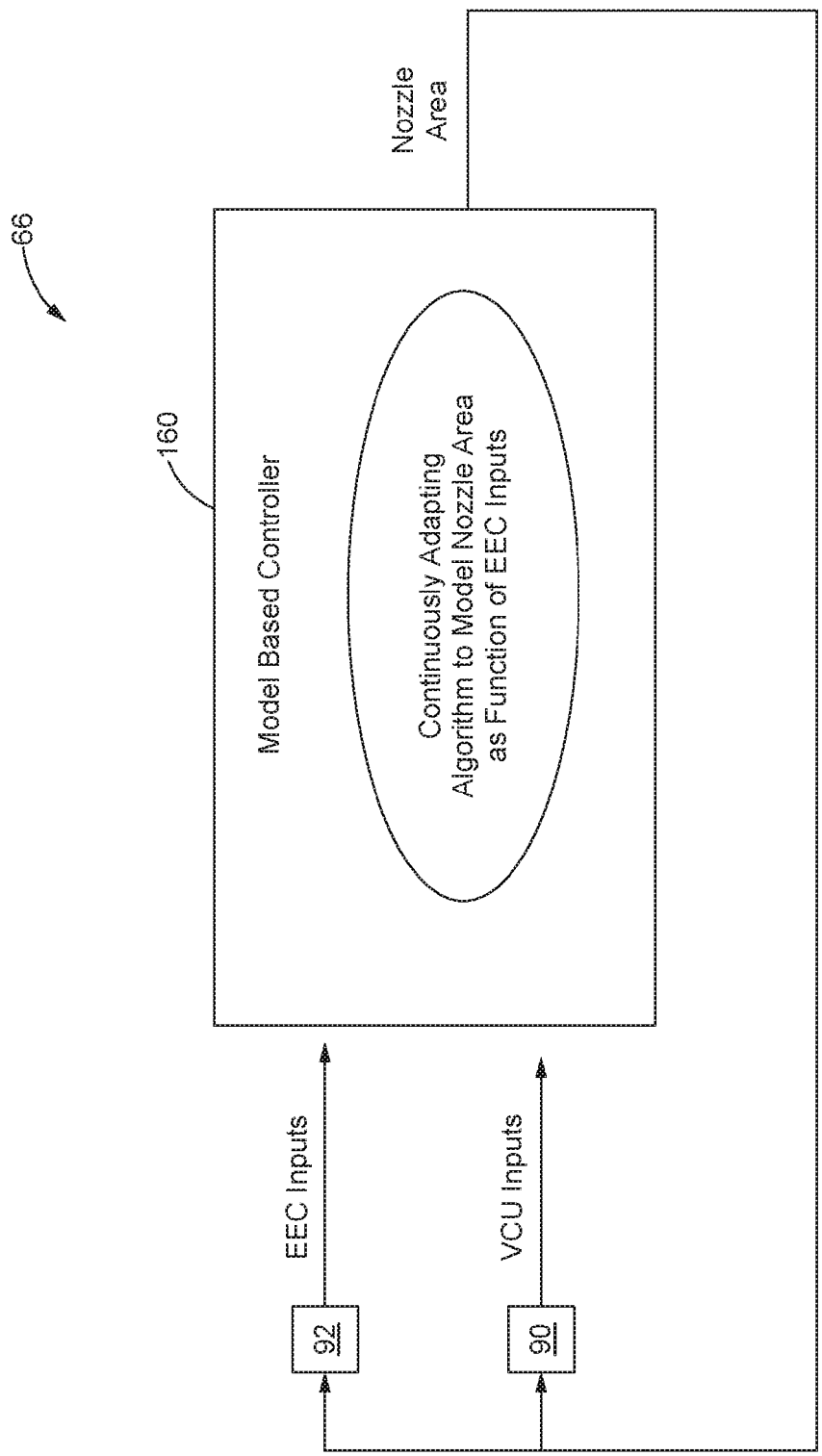
FIG. 10 is a schematic representation of a model based controller.

Turning now to FIG. 10, with continued reference to FIGS. 1-9, the control module 66 may further include a model based controller 160. The model based controller 160 may be implemented via the VAFN control unit 90 or a separate processor-based device. Furthermore, the model based controller 160 includes a learning algorithm preprogrammed into the memory 94 associated with the VAFN control unit 90 or other processor-based device. With the learning algorithm, the model based controller 160 learns or estimates the real-time nozzle area of the VAFN 24.

More specifically, the model based controller 160 comprises a mathematical model that receives inputs from the engine electronic control 92 and the VAFN control unit 90 and continuously adapts constants in the mathematical model based on the received inputs. Inputs from the engine electronic control 92 may include, but not be limited to, engine speeds, engine temperatures, Mach numbers, desired nozzle areas, and the like. Inputs from the VAFN control unit 90 may include, but not be limited to, sensor feedback from the VAFN 24, calculated nozzle areas determined by the VAFN control unit 90, and the like.

The mathematical model matches the nozzle area of the VAFN 24 as a function of the inputs from the engine electronic control 92 and the VAFN control unit 90. The model based controller 160, therefore, represents a real-time performance and life span of the engine 20. In so doing, the model based controller 160 can function as a backup controller to estimate the real-time nozzle area of the VAFN 24 if the primary data from the primary system 62 is unavailable. For example, when an operational transient of the engine 20 is determined, the model based controller 160 stops adapting constants in the mathematical model and uses the inputs from the engine electronic control 92 and a final updated version of the mathematical model to estimate the real-time nozzle area of the VAFN 24. This allows for a time-limited dispatch of the engine 20 without reliance on the primary system 62.

In addition, the model based controller 160 can provide an alternate means for detection of operational transients of the engine 20. The model based controller 160 is configured to compare the estimated nozzle area from the mathematical model to the calculated nozzle area determined by the VAFN control unit 90. If the estimated nozzle area from the mathematical model is unequal to the calculated nozzle area from the VAFN control unit 90, or if the estimated nozzle area is outside a predetermined margin of the calculated nozzle area from the VAFN control unit 90, then the model based controller 160 is configured to determine an operational transient of the engine 20. The model based controller 160 is further configured to send signals to the engine electronic control 92 in order to alert aircraft crew members of the operational transient.

INDUSTRIAL APPLICABILITY

From the foregoing, it can be seen that the teachings of this disclosure can find industrial application, technical effects and benefits in any number of different situations, including but not limited to, engines, such as gas turbine engines. Such engines may be used, for example, on aircraft for generating thrust, or in land, marine, or aircraft applications for generating power.

The present disclosure provides a control system for a variable area fan nozzle (VAFN) of a gas turbine engine. The disclosed control system uses primary system sensor data from the VAFN in order to determine a real-time nozzle area, along with predetermined lookup tables preprogrammed into a memory associated with the control system to generate an actuator command for the petals of the VAFN. In addition, the disclosed control system uses secondary system sensor data from the engine to adjust the generated actuator command and the nozzle area of the VAFN for performance seeking control.

The secondary system sensor data includes a backpressure of the engine and/or a fan blade strain of the engine. With the secondary system sensor data, the disclosed control system also detects operational transients of the engine, alerts aircraft crew members of the operational transients, and moves the petals of the VAFN to a failsafe position when operational transients are detected. The disclosed control system further includes a model based controller that learns and estimates the real-time nozzle area based on inputs from the engine electronic control. In so doing, the disclosed control system provides a redundant or secondary system for fine control of the VAFN and performance monitoring of the engine.

Figure 11:
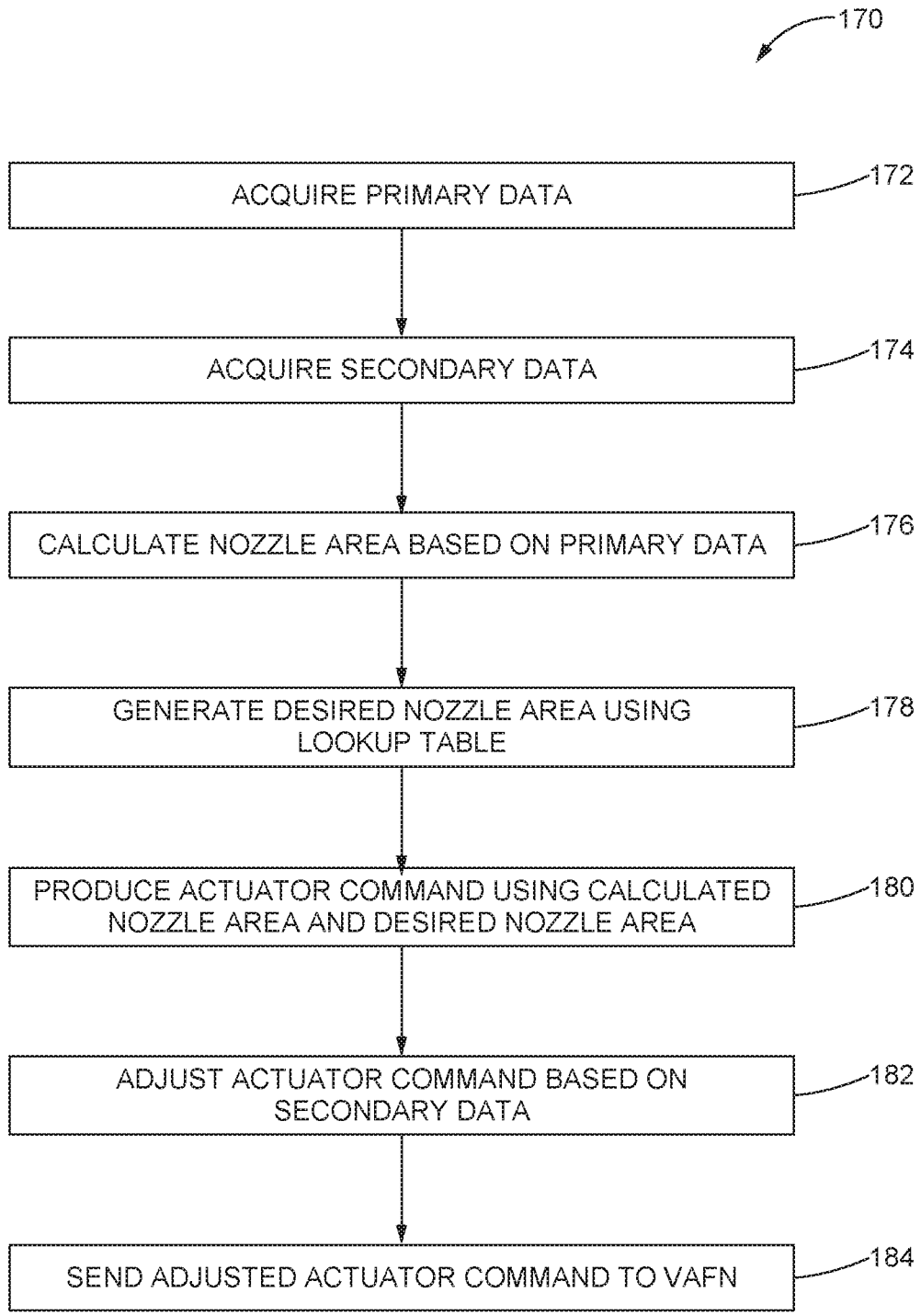
FIG. 11 is a flowchart illustrating an example process of controlling a nozzle area of a VAFN.

Referring now to FIG. 11, with continued reference to FIGS. 1-10, a flowchart illustrating an example process 170 of controlling a nozzle area of a VAFN 24 is shown. The VAFN 24 has a plurality of petals 30 and is for use with a gas turbine engine 20. At block 172, primary data indicative of an operating condition of the VAFN 24 is acquired from the primary system 62. At block 174, secondary data indicative of a backpressure and a fan blade strain of the gas turbine engine 20 is acquired from the secondary system 64.

The nozzle area of the VAFN 24 is calculated by the VAFN control unit 90 based on the primary data, at block 176. A desired nozzle area based at least in part on a predetermined table of nozzle areas is generated by the engine electronic control 92, at block 178. At block 180, an actuator command is produced by the VAFN control unit 90 based on a difference between the calculated nozzle area and the desired nozzle area.

The actuator command is adjusted by the VAFN control unit 90 based on the secondary data, at block 182. However, instead of the actuator command, the desired nozzle area may be adjusted based on the secondary data, as described above in the example of FIGS. 6 and 7. At block 184, the adjusted actuator command is sent to the VAFN 24 to move the plurality of petals 30. A control module 66, including the VAFN control unit 90 and the engine electronic control 92, associated with the VAFN 24 and the gas turbine engine 20 performs the calculating, generating, producing, adjusting, and sending.

It is to be understood that the flowchart in FIG. 11 is shown and described as an example only to assist in disclosing the features of the disclosed control system, and that more or less steps than that shown may be included in the processes corresponding to the various features described above for the disclosed control system without departing from the scope of the disclosure.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A control system for a variable area fan nozzle (VAFN) having a plurality of petals, the VAFN for use with a gas turbine engine, the control system comprising:
    a primary system configured to acquire primary data indicative of an operating condition of the VAFN;
    a secondary system configured to acquire secondary data indicative of a current operating condition of the gas turbine engine; and
    a control module in operative communication with the primary system and the secondary system, the control module configured to:
        determine a nozzle area of the VAFN based at least in part on the primary data,
        adjust the determined nozzle area based on the secondary data, and
        position the plurality of petals according to the adjusted nozzle area.

2. The control system of claim 1, wherein the secondary data includes data indicative of a backpressure of the gas turbine engine.

3. The control system of claim 2, wherein the secondary system includes at least one pressure sensor configured to determine the backpressure of the gas turbine engine.

4. The control system of claim 3, wherein the at least one pressure sensor is disposed proximate an aft end of a core engine nacelle of the gas turbine engine.

5. The control system of claim 1, wherein the secondary data includes data indicative of a fan blade strain of the gas turbine engine.

6. The control system of claim 5, wherein the secondary system includes at least one strain sensor configured to determine the fan blade strain of the gas turbine engine.

7. The control system of claim 6, wherein the at least one strain sensor comprises a fiber optic strain sensor disposed on a fan blade of the gas turbine engine.

8. The control system of claim 1, wherein the control module is further configured to determine an operational transient of the gas turbine engine based on the secondary data.

9. The control system of claim 8, wherein the control module is further configured to send a signal to alert aircraft crew members of the operational transient.

10. The control system of claim 9, wherein the control module is further configured to move the plurality of petals to a failsafe position when the secondary data indicates the operational transient.

11. An aircraft, comprising:
a gas turbine engine;
a variable area fan nozzle (VAFN) mounted to a downstream end of the gas turbine engine, the VAFN including a plurality of petals and at least one actuator configured to move the plurality of petals; and
a control system in operative communication with the gas turbine engine and the VAFN, the control system including:
at least one pressure sensor configured to determine a backpressure of the gas turbine engine;
at least one strain sensor configured to determine a fan blade strain of the gas turbine engine; and
a control module in operative communication with the at least one pressure sensor, the at least one strain sensor, and a primary system configured to configured to acquire primary data indicative of an operating condition of the VAFN, the control module configured to:
calculate a real-time nozzle area of the VAFN based at least in part on the primary data,
generate an actuator command based at least in part on the real-time nozzle area and a predetermined table of nozzle areas preprogrammed into a memory of the control module,
modify the actuator command based on at least one of the determined backpressure and the determined fan blade strain, and
send the modified actuator command to the at least one actuator of the VAFN to adjust the plurality of petals.

12. The aircraft of claim 11, wherein the at least one pressure sensor comprises one of a LIDAR based pressure sensor or a pitot tube.

13. The aircraft of claim 11, wherein the control module is implemented via an engine electronic control and a VAFN control unit.

14. The aircraft of claim 13, wherein the control module includes a model based controller configured to estimate a nozzle area of the VAFN when primary data is unavailable.

15. The aircraft of claim 14, wherein the model based controller includes a learning algorithm for estimating the nozzle area based on inputs into the engine electronic control.

16. The aircraft of claim 15, wherein the control module is further configured to determine an operational transient of the gas turbine engine if the estimated nozzle area from the model based controller is outside a predetermined margin of a calculated nozzle area determined by the VAFN control unit.

17. A method for controlling a nozzle area of a variable area fan nozzle (VAFN) having a plurality of petals, the VAFN for use with a gas turbine engine, the method comprising:
acquiring primary data indicative of an operating condition of the VAFN;
acquiring secondary data indicative of a backpressure and a fan blade strain of the gas turbine engine;
calculating the nozzle area of the VAFN based on the primary data;
generating a desired nozzle area based at least in part on a predetermined table of nozzle areas;
producing an actuator command based on a difference between the calculated nozzle area and the desired nozzle area;
adjusting the actuator command based on the secondary data; and
sending the adjusted actuator command to the VAFN to move the plurality of petals, the calculating, generating, producing, adjusting, and sending being performed by a control module associated with the VAFN and the gas turbine engine.

18. The method of claim 17, further comprising learning a nozzle area of the VAFN based on inputs into an engine electronic control of the gas turbine engine, the learning being performed by a model based controller of the control system.

19. The method of claim 17, further comprising using the secondary data to determine an operational transient of the gas turbine engine.

20. The method of claim 19, further comprising alerting aircraft crew members of the operational transient and moving the plurality of petals of the VAFN to a failsafe position when the operational transient is determined.

* * * * *

UNITED STATES PATENT AND TRADEMARK OFFICE
CERTIFICATE OF CORRECTION

| | |
|---|---|
| PATENT NO. | : 9,803,586 B1 |
| APPLICATION NO. | : 15/169155 |
| DATED | : October 31, 2017 |
| INVENTOR(S) | : Jason J. Jackowski et al. |

It is certified that error appears in the above-identified patent and that said Letters Patent is hereby corrected as shown below:

In the Claims

Column 13, Line 36, delete the second instance of the phrase "configured to".

Signed and Sealed this
Twenty-second Day of May, 2018

Andrei Iancu
*Director of the United States Patent and Trademark Office*